E. CURNUTT.
BALE TYING MECHANISM FOR BALING PRESSES.
APPLICATION FILED MAY 19, 1913.
1,091,296.
Patented Mar. 24, 1914.
5 SHEETS—SHEET 1.
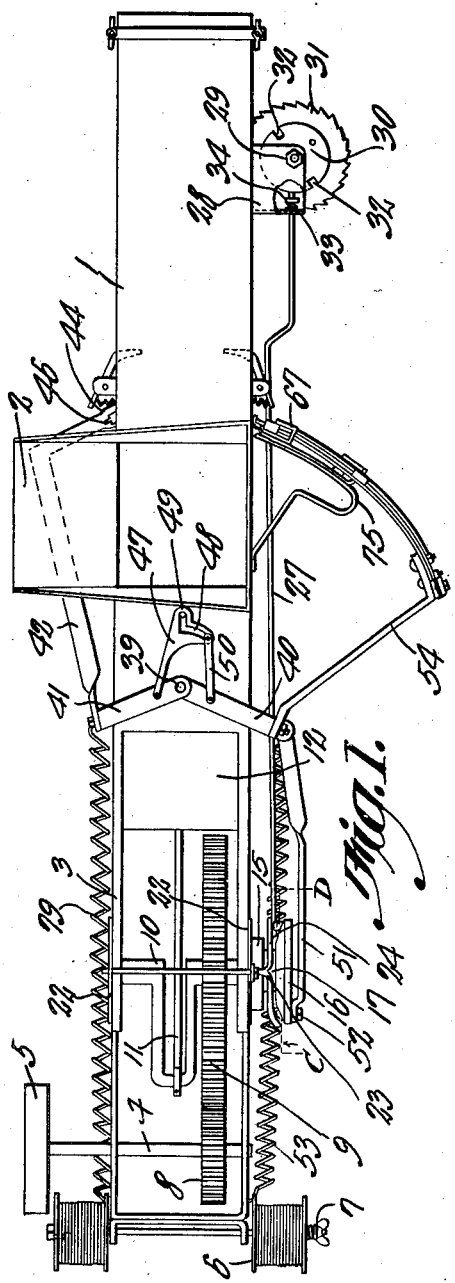
Witnesses
Elmer Curnutt, Inventor
by C. A. Snow & Co., Attorneys

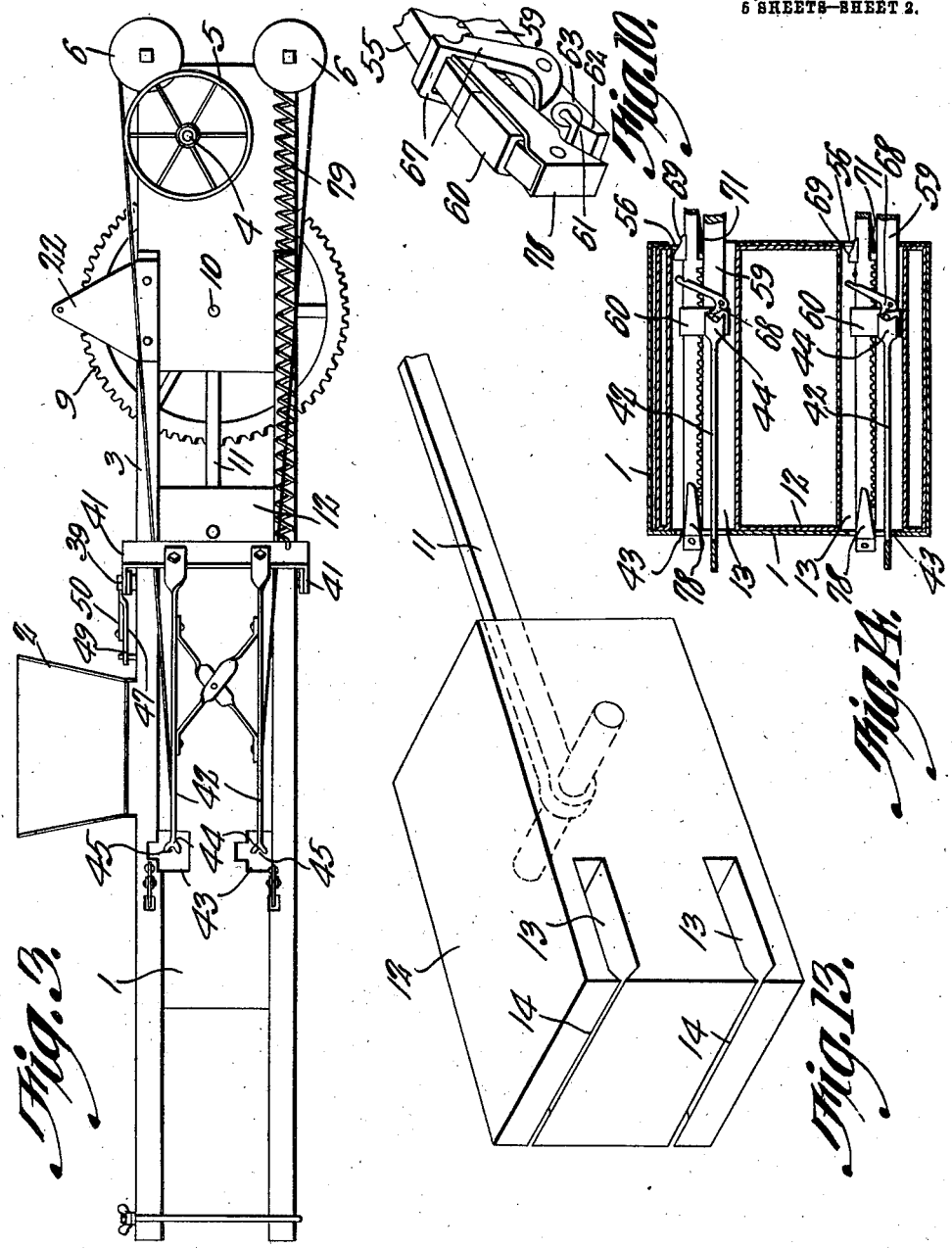

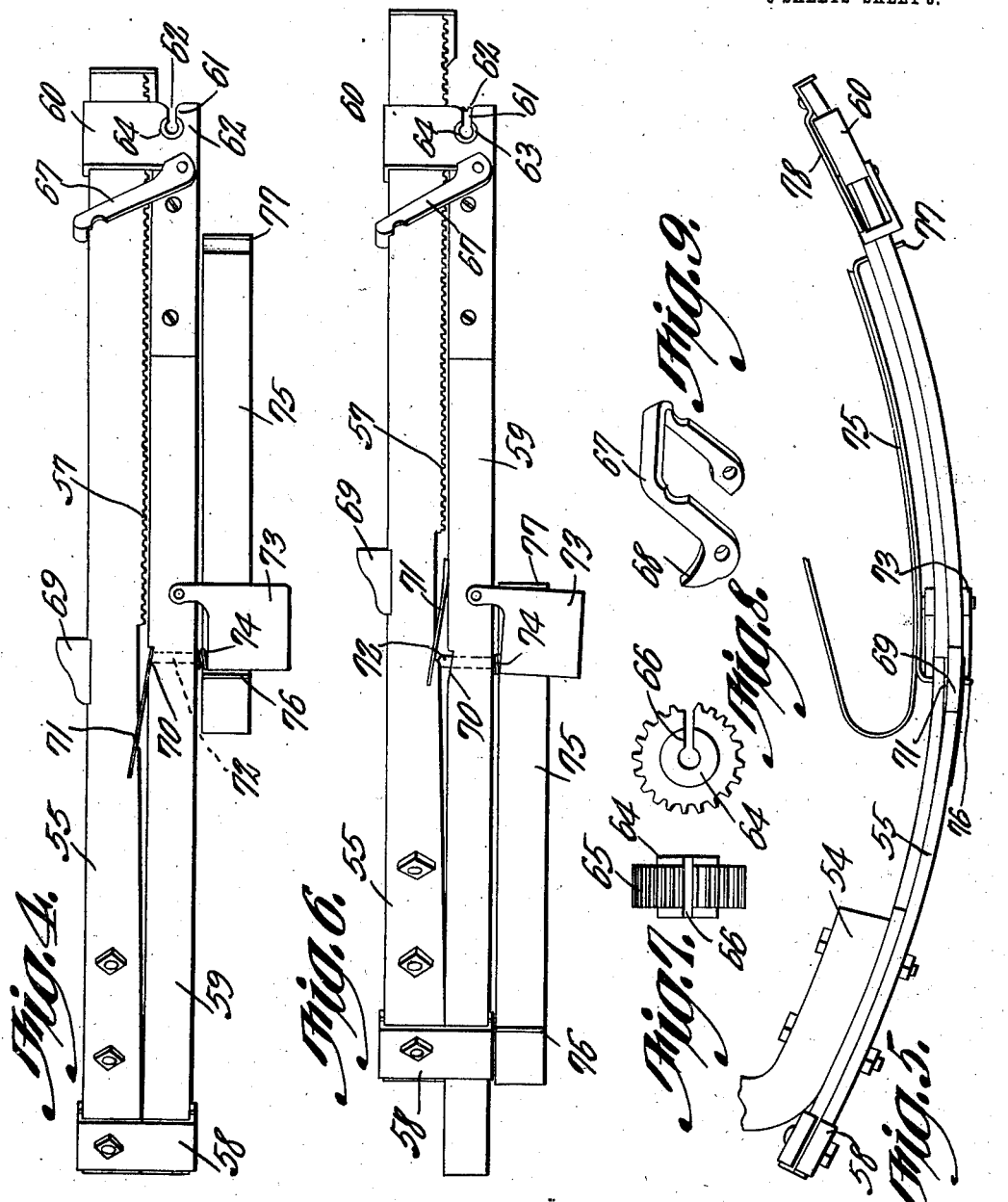

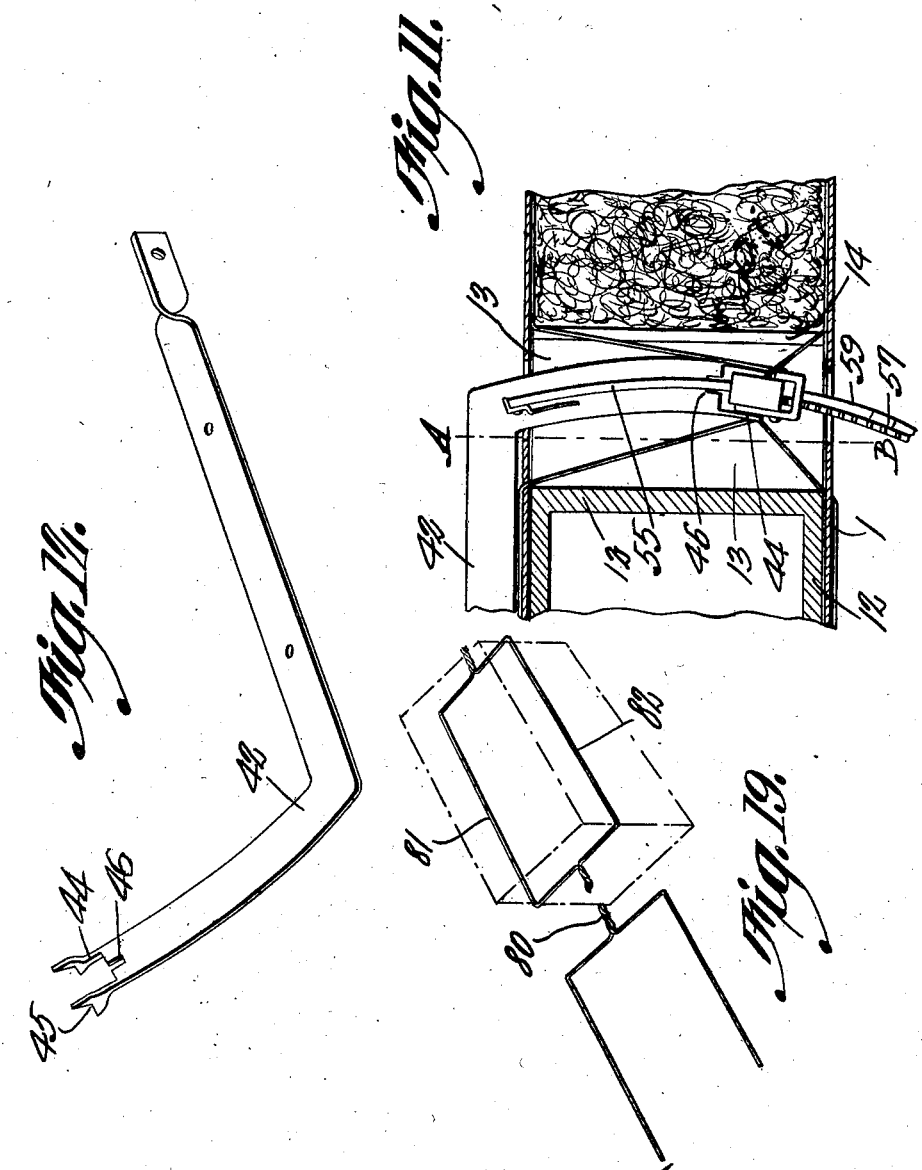

E. CURNUTT.
BALE TYING MECHANISM FOR BALING PRESSES.
APPLICATION FILED MAY 19, 1913.
1,091,296.
Patented Mar. 24, 1914.
5 SHEETS—SHEET 5.
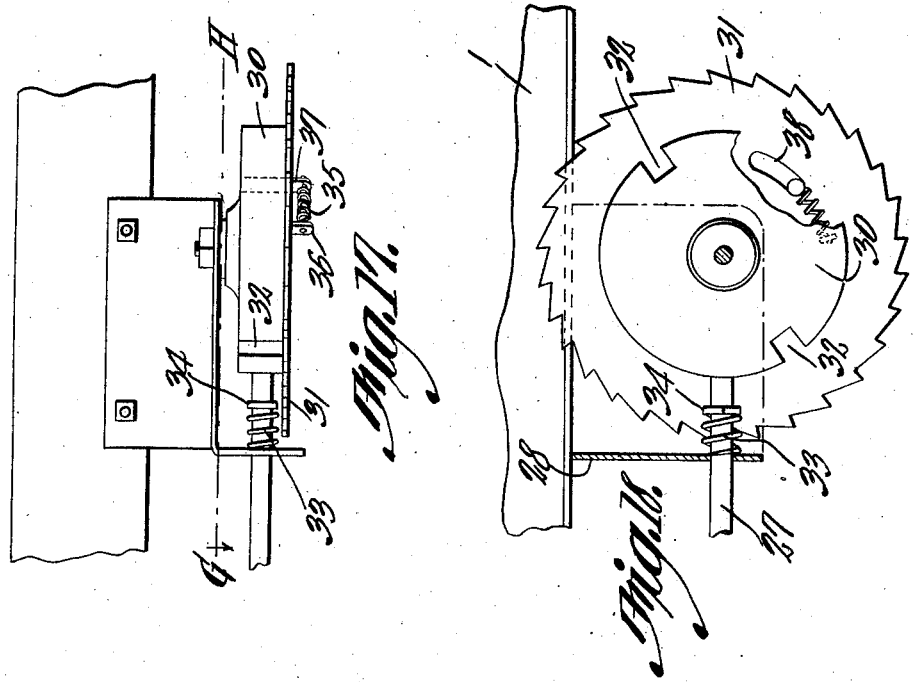
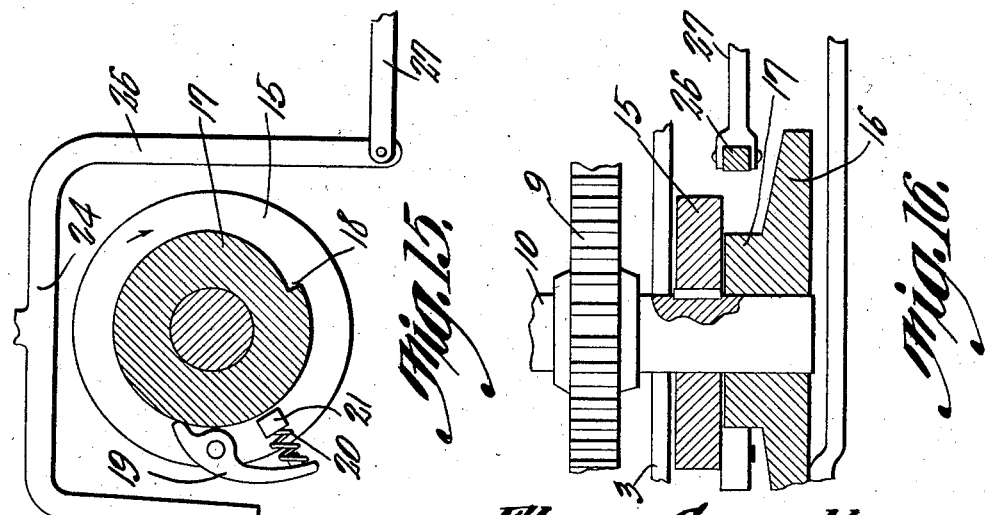
Witnesses
Elmer Curnutt
Inventor
by C. A. Snow & Co.
Attorneys

UNITED STATES PATENT OFFICE.

ELMER CURNUTT, OF GARNETT, KANSAS.

BALE-TYING MECHANISM FOR BALING-PRESSES.

1,091,296.   Specification of Letters Patent.   Patented Mar. 24, 1914.

Application filed May 19, 1913. Serial No. 768,634.

*To all whom it may concern:*

Be it known that I, ELMER CURNUTT, a citizen of the United States, residing at Garnett, in the county of Anderson and State of Kansas, have invented a new and useful Bale-Tying Mechanism for Baling-Presses, of which the following is a specification.

This invention relates to baling presses and more particularly to mechanism for tying the bales, one of the objects of the invention being to provide mechanism of this character which will operate automatically to tie the bales when they reach a predetermined size, timing mechanism of novel construction being employed for controlling the operation of the tying mechanism.

A further object is to provide improved means whereby tie wires, which are extended partly around the formed bale, are pressed inwardly toward each other and twisted together when the bale reaches a predetermined size, the twisted portions being automatically severed so as to release the tied bale immediately prior to the starting of a new bale.

Another object is to provide novel means whereby the twisting of the ties is effected when the ties are brought together.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a baling press having the present improvements combined therewith, the parts being shown in the positions assumed thereby immediately prior to the operation of forming a bale. Fig. 2 is a side elevation of the structure shown in Fig. 1. Fig. 3 is a view showing the opposite side of the apparatus in elevation. Fig. 4 is an enlarged elevation of the needle and its supporting arm together with adjacent parts of the controlling mechanism. Fig. 5 is a plan view of the structure shown in Fig. 4. Fig. 6 is a side elevation of the parts shown in Fig. 4 but showing a position assumed thereby while the needle is being held against movement and the supporting arm is rotating the twister. Fig. 7 is an edge view of the twister. Fig. 8 is a side view thereof. Fig. 9 is a perspective view of the tie cutter. Fig. 10 is a perspective view of the active end portion of the needle and its supporting arm and showing the tie cutter and its setting dog. Fig. 11 is a horizontal section through a portion of the mechanism and showing the needle and the fork holding the opposed portions of the tie together and in the act of twisting the same. Fig. 12 is a perspective view of one of the forks. Fig. 13 is a perspective view of the follower. Fig. 14 is a section on line A—B Fig. 11. Fig. 15 is an enlarged section on line C—D Fig. 1. Fig. 16 is an enlarged end section on line E—F Fig. 2. Fig. 17 is a side elevation of the timing mechanism. Fig. 18 is a section on line G—H Fig. 17, parts being broken away. Fig. 19 is a perspective view showing the form of tie produced about a bale and the severed connection between the completed tie and the connected wires remaining in the machine ready to embrace the next formed bale.

Referring to the figures by characters of reference 1 designates a press box having a feed hopper opening into the top thereof, this hopper being indicated at 2. A suitable frame or other structure 3 is arranged back of the press box and journaled within this frame is a transverse drive shaft 4 which may be operated in any suitable manner, as by means of a belt engaging a pulley 5 secured to the shaft. A pair of reels 6 may be arranged at each side of the structure 3 for holding coils of wire to be used in tying bales, the reels of each pair being preferably arranged one above the other, as shown in Fig. 2 and each reel having any suitable means, such as a spring 7, for retarding the rotation thereof. Shaft 4 has a drive gear 8 secured to it and this gear meshes with a larger gear 9 which is secured to a crank shaft 10 journaled in the structure 3. This crank shaft is connected, by a pitman 11, to a follower 12 mounted for reciprocation within the press box 1, this follower being formed with transverse upper and lower slots 13 the front ends of which are reduced in width, as shown at 14 so that a comparatively narrow slot extends throughout the width of the front face of the follower near the top and bottom thereof.

A disk 15 is keyed or otherwise secured to shaft 10 so as to rotate therewith and another disk 16 is loosely mounted on said shaft close to the disk 15. Disk 16 has a hub 17 lying close to the disk 15 and a notch 18 is formed in the periphery of the hub. A dog 19 is pivotally mounted on one side of the revoluble disk 15 and a spring 20 is interposed between one end of this dog and a lug 21 on disk 15 so as thus to hold the active end of the dog 19 normally in contact with the periphery of the hub 17.

A bracket 22 is connected to the structure 3 and a hanger 23 is pivotally connected to this bracket and is provided at its lower end with a yoke 24 constituting dog actuating means. This yoke is made up of two downwardly extending arms 25 and 26, the arm 26 being longer than the arm 25 and being pivotally connected to a rod 27 which extends along one side of the press box and is mounted within a guide bracket 28 secured to the press box adjacent the discharge end thereof. A stud 29 extends downwardly from the bracket and mounted for rotation on this stud is a disk 30 secured upon the center of a toothed wheel 31. This toothed wheel projects through the side of the press box and into the path of the bale being formed so that, as the bale is pressed forward, wheel 31 will be caused to rotate and disk 30 will thus likewise revolve. Disk 30 has one or more notches 32 in its periphery. In the structure illustrated two of these notches are provided at diametrically opposed points. The end of rod 27 bears against the periphery of disk 30 and a spring 33 is mounted on the rod and pushes against bracket 28 and a collar 34 on the rod so as thus to hold the end of the rod pressed yieldingly against the disk. When, however, one of the notches 32 is brought into line with the rod, the end of the rod will be projected into the notch. It is to be understood that the disk 30 is not connected directly to the wheel 31 but is, instead, yieldingly connected. This yielding connection is effected through the use of a coiled spring 35 arranged under wheel 31 and secured at one end to an ear 36 extending downwardly from the wheel and at its other end to an ear 37 extending downwardly from disk 30, this ear 37 being slidable in a slot 38 in wheel 31. Thus it will be seen that while disk 30 and wheel 31 will rotate together under ordinary conditions, when disk 30 is brought to an abrupt stop by rod 27 entering one of the notches 32, the wheel 31 will be brought to a gradual stop in view of the fact that spring 35 will yield.

When rod 27 is in contact with the periphery of disk 30, it holds the long arm 29 pressed rearwardly so that, during the rotation of disk 15 with shaft 10, the long arm of dog 19 will strike the arm 26 as the dog moves downwardly and the active end of the dog will thus be lifted over the notch 18. Thus the shaft 10 can rotate continuously without causing the disk 16 to be coupled thereto. When, however, disk 30 is brought into position with one of its notches 32 in alinement with the rod 27, said rod will shift into the notch and pull upon arm 26, thereby moving said arm from the path of the dog 19 so that, as the dog moves downwardly in the direction of the arrow in Fig. 15, it will enter notch 18 and thus couple disk 16 to the shaft 10 so that said disk will rotate with the shaft. Furthermore this movement of rod 27 will pull the short arm 25 toward the path of the dog 19, the arm 25 being of such length that, after dog 19 completes one half a revolution while in engagement with notch 18, the long arm of the dog will be depressed by arm 25, thus disengaging the dog from the notch 18.

From the foregoing it will be seen that when shaft 10 is rotated, the follower 12 will be reciprocated and will compress material within the press box 1, this material as it is forced toward the discharge end of the press box, causing wheel 31 to rotate. This wheel is so proportionated that when a suitable amount of material to form a bale has passed the wheel, one of the notches 32 will be brought into position to receive rod 27 and disk 16 will thus be coupled to shaft 10 in the manner hereinbefore described. Disk 16 operates the binding and twisting mechanism which will now be described.

Mounted upon studs 39 which extend upwardly and downwardly from the top of the press box 1 and back of the feed hopper 2 are oppositely disposed yokes 40 and 41. Yoke 41 has L-shaped needles 42 fixedly connected thereto and having their inwardly extending terminal portions arranged to enter openings 43 in one side of the press box. The free end of each of these needles is forked, as shown at 44 and the terminal of each member of each fork is notched, as shown at 45, so as to straddle a tie wire. An additional notch or recess 46 is formed in each needle 42 and opens into the space between the members 44 of the fork. This specific construction of the needle 42 has been illustrated in detail in Fig. 12.

A guide plate 47 is pivotally connected to yoke 41 and has an L-shaped slot 48 into which extends a guide pin 49 projecting from the top of the press box. A link 50 connects this plate 47 to yoke 40. A pitman 51 connects yoke 40 to a wrist pin 52 projecting from the disk 16. A spring 53 is secured to the rear portion of the structure 3 and is also secured to the yoke 40 so that said yoke is held normally drawn rearwardly with the pitman 51 pressing against the wrist pin 52 and holding said wrist pin in its rearmost position, as shown in Fig. 2 and consequently, holding the notch 18 normally in the position shown in Fig. 15.

An angular frame 54 is fixedly connected to the yoke 40 and secured to the upper and lower portions of this frame are arcuate needle supporting arms 55 the free or inner ends of which are held by spring 53 outside of but close to openings 56 formed in one side of the press box 1. Each of these arms 55 has rack teeth 57 extending along the lower edge thereof from the free end of the arm, these teeth being preferably extended along about one half the length of the arm. A supporting loop 58 extends downwardly from that end portion of arm 56 secured to frame 54 and is slidably engaged by an arcuate needle 59 arranged under and parallel with the arm 55 and provided, at its inner or active end with an upwardly extending guide loop 60 which extends around and is slidably mounted on the arm 55. The inner or active end of needle 59 has a transverse slot 61 the outer end of which is flared as at 62 and this slot terminates at its inner end in an eye 63. A cylinder 64 is mounted for rotation in the eye and a gear 65 is formed integral with this cylinder and meshes with the rack teeth 57. The cylinder has a radial slot 66 which interrupts the gear 65 and normally registers with the slot 61. A yoke 67 straddles the arm 55 and is pivotally mounted upon the needle 59 back of and close to the eye 63, there being a knife blade 68 extended from the rear side of the yoke and normally supported above the eye 63. The upper portion of the yoke lies close to the upper edge of the arm 55 and is adapted to be engaged by an actuating lug 69 secured upon the top of the arm 55 when said arm is moved in one direction independently of the needle 59 in the manner hereinafter described. A notch 70 is formed in the upper edge of the needle 59 and is normally engaged by a leaf spring 71 or the like constituting a latch. A pin 72 extends downwardly through the needle and rests on a lifting dog 73 which is pivotally connected to and suspended from the needle. A spring 74 is interposed between the lifting dog and lever and serves to hold said dog normally pressed downwardly so that the pin 72 can thus lie in lowered position and permit the spring 71 to rest in notch 70.

An arcuate strip 75 is secured to one side of the press box in any suitable manner and has outstanding stop ears 76 and 77. The dog 73 is adapted to travel between these ears and close to the strip 75. A knife setting dog 78 is pivotally connected to and extends across the front end of the arm 55 and one end of this dog normally bears against the yoke 67, as shown in Fig. 10.

Presuming that rod 27 is bearing at one end against the periphery of disk 30, the operation of the mechanism may be described as follows:—When the follower 12 is reciprocated in the manner hereinbefore described, the material supplied in the path thereof through hopper 2 is gradually compressed within the box 1 and this compressed material engages the toothed wheel 31 and causes said wheel to slowly rotate. This compressed material is forced against a wire which extends across the press box and is wound upon two opposed reels 6. Thus, as the material being compressed is forced longitudinally within the press box, the wire is gradually pulled off of its reels, the opposed strands of the wire extending along opposed sides of the press box and in the paths of the needles 59 and 42. When a sufficient amount of material to form a bale has been placed under pressure, the wheel 31 will have rotated a sufficient distance to bring one of the notches 32 in line with the rod 27. Thus said rod will promptly spring into the notch and will pull on arm 26 so that, as shaft 10 continues to rotate, dog 19 will couple disk 16 to disk 15 and said disk 16 thus be caused to rotate. The parts are so timed that this rotation of disk 16 will occur while the follower 12 is moving forward and, therefore, the pitman 51 will push against frame 40 thereby elongating spring 53 and causing the frame to swing about its pivot studs 39. Link 50 will push against plate 47 during this swinging movement of yoke 40 and as plate 47 is prevented from swinging laterally by the stud or pin 49, it will be seen that said plate is necessarily slid forwardly and will, consequently, pull on the yoke 41. Thus the yoke 41 will swing about the pivot studs 39 and cause the forked ends of the needles to pass inwardly through the openings 43 and into press box and, as soon as the forked ends of these needles reach positions adjacent the center of the press box, the laterally extending portion of the slot 48 will be brought opposite the pin 49 so that further pressure through link 50 and against the plate 47 will cause said plate to swing laterally, thus bringing the pin 49 into the laterally extending portion of the slot 48 and, consequently, locking the needles 42 against return movement. Furthermore this arrangement permits further swinging movement of the yoke 40 independently of the yoke 41. It will be noted that a spring 79 is connected to yoke 41 and to the structure 3 so that, when yoke 41 is swung by plate 47 in the manner described, this spring will be placed under tension. This swinging movement of the needles 42 will cause the notched members of the forks 44 to engage the wires in the paths thereof and to press the wires through the openings 33 and back of the formed bale.

During the foregoing movement of the needles 42, the frame 54 is swinging toward the side of the press box and causing each arm 55 and its needle 59 to pass through its opening 56 until the eye 63 of the needle is brought into position within the opposed fork 44. This inward movement of the needle will cause said needle to engage the wire extending across the end thereof so that the wire will enter the slot 61 and likewise the slot 66, said wire thus being pressed inwardly back of the formed bale and into the notches 45 in fork 44. At the same time the wire which has been pressed inwardly by the fork 44 becomes seated within the slots 62 and 66. As soon as the needle 59 assumes a position with its eye 63 in the fork 44, said eye thus being brought into engagement with both wires where they are held together back of the formed bale, the dog 73 comes against stop 77 and is thus swung upwardly so as to push against pin 72 and lift the spring latch 71. Thus the arm 55 becomes disengaged from needle 59 and continues to move inwardly independently of the needle. The rack teeth 57 will therefore rotate the gear 65 so that the wire held within the slot 66 will be twisted together. During the completion of this movement of arm 55 relative to needle 59, the lug or ear 69 comes against yoke 67 and swings it about its pivot, thus causing knife blade 68 to swing downwardly and sever the wires at the center of the twisted portion, as shown at 80 in Fig. 19, the two opposed wires being indicated at 81 and 82 in said figure. Thus those portions of the wires extending around the bale will be twisted together and the bale completed while the ends of the wires extending from the reels will remain twisted together so that, when additional material is pressed forwardly by the follower, said material will press against these wires where they extend transversely of the press box.

Immediately subsequent to the cutting of the twisted portions of the wires, the dog 19 comes against short arm 25 and shifts the dog thus releasing disk 16 so that spring 53, which has been placed under tension, will be free to swing the yoke 40 back to its initial position and cause pitman 51 to rotate disk 16 back to its normal position. During this return movement of the yoke 40, the arm 55 is shifted outwardly along the needle 59 until the dog 78 strikes the yoke 67 whereupon relative movement of the arm and needle is stopped and the yoke is swung about its pivot so as to reset the cutting blade 68. At the same time the spring fastener 71 drops into the notch 70 and further movement of the arm 55 will result in corresponding movement of the needle until dog 73 comes against the stop 76, whereupon the mechanism becomes reset. When the dog 19 lifts out of notch 18 it also presses against arm 25 with sufficient force to swing the hanger 23 and cause arm 26 to pull on rod 27, thus lifting the rod out of the notch 32 in which it is seated and permitting the foregoing operation to be repeated.

It will be apparent that by providing mechanism such as herein described, bales can be securely tied immediately upon the completion of the compression thereof, this tying operation taking place automatically at the proper time.

By varying the size of the wheel 31 and changing the positions of the notches 32 or varying the number of notches 32, the size of the bale can be varied by thus causing more or less material to be compressed before the tying mechanism is set in operation.

The mechanism of the apparatus is so timed that the needles 42 and 59 move into the press box while the follower is traveling forward against the material, the slots 13 being at this time between the openings 56 and 43 so that the needles can enter the slots. Furthermore the twisting and cutting operation hereinbefore described likewise takes place while the needles are extended into the slots 13 and during the return movement of the follower 12, the needles being withdrawn quickly from the follower just prior to the complete withdrawal of the follower from between the openings 43 and 56. Thus the end of the follower keeps the material pressed forward away from the needles during the twisting operation and there is no danger of the straw or other material being baled becoming entangled with the needles and with the mechanism carried thereby.

It is to be understood that one pair of needles is to be provided for each pair of reels 6 and while, in the drawings, two pairs of reels and two pairs of needles have been illustrated, it is to be understood that this number may be increased or diminished if desired.

What is claimed is:—

1. The combination with a baling press, of a pair of wire carrying needles movable inward from opposite sides of the press, a twisting element carried by one of the needles, twister operating mechanism carried by said needle, means for shifting the twister operating mechanism into and out of the press, means for coupling the last named needle to said mechanism to move therewith into the press, and means for automatically uncoupling said mechanism and needle at a predetermined point during the inward movements thereof to permit continued inward movement of the mechanism independently of the needle.

2. The combination with a baling press, of oppositely disposed needles for feeding a continuous length of wire from each side of the machine inward to points between successive bales, a twisting element carried by one of the needles into engagement with both of the wires when interposed between the bales, means upon the same needle with the twisting element for rotating said element when brought into engagement with both interposed wires, means connected directly to said last named means for shifting the same into the press, means for normally coupling said actuating means of the twisting element to the needle carrying the twisting element and means for automatically uncoupling said needle when the twisting element is brought into engagement with the two wires.

3. The combination with opposed wire carrying needles for constantly engaging a wire, of means for forcing the needles toward each other, a slotted revoluble member carried by one of the needles and adapted to receive both wires, and means supported by the same needle with the revoluble member, for successively shifting said needle to active position and then revolving the said member to thereby twist the wires together.

4. The combination with a pair of wire carrying needles, one of said needles being forked for engagement with a wire, and the other needle being slotted, of a twisting member carried by the slotted needle and adapted to receive the wires of both needles, and means carried by the needle in which the twister is mounted, for successively shifting the needle to active position and then actuating said twister.

5. The combination with opposed wire carrying needles, one of said needles being forked to engage one of the wires, and the other needle being slotted, of a revoluble twisting element carried by the slotted needle and having a slot for the reception of both wires, and means carried by the needle carrying the twisted element, for successively shifting the needle to active position and then revolving said twisting element when in engagement with both wires.

6. The combination with opposed wire carrying needles, one of said needles being forked to hold the wire stretched thereacross and the other needle having a slotted terminal for engaging the stretched portion of the wire and extending into the fork, of a revoluble twisting element carried by the slotted needle and adapted to engage both wires, and means carried on the needle with the twisting element for successively shifting said needle to active position and then rotating said twisting element while in engagement with both wires.

7. The combination with opposed wire carrying needles, one of said needles being forked to hold the wire stretched thereacross and the other needle having a slotted terminal for engaging the stretched portion of the wire and extending into the fork, of a revoluble twisting element carried by the slotted needle and adapted to engage both wires, longitudinally movable means carried on the needle with the twisting element for successively shifting the needle into engagement with the wires and then rotating said twisting element while in engagement with both wires, and means carried by the needle with the twisting element and its actuating means, for severing the wires, subsequent to the twisting operation.

8. In a machine of the class described, a pair of wire carrying needles having interengaging portions each adapted to receive and guide a wire, a revoluble twisting element carried by one of the needles and slotted to receive both wires, and longitudinally movable means carried by the same needle with the twisting element for successively shifting said needle into active position and then actuating said element.

9. In a machine of the class described, a pair of wire carrying needles, a toothed twisting element carried by one of the needles, a rack slidably mounted on the needle carrying a twisting element and engaging the teeth on said element to rotate the element during the relative movement of the rack and a needle, a knife carried by said needle with the twisting element, and means actuated by the rack for operating the knife to sever the wires subsequent to the operation of the twisting element by the rack.

10. The combination with compressing mechanism, of a needle having a forked portion for engaging that portion of a tie at one side of the bale being formed, a twisting element for engaging that portion of the tie at the other side of the bale being formed, means for shifting said needle and the twisting element into position back of the formed bale to bring the twisting element into engagement with that portion of the tie engaged by the forked portion, an arm for moving the twisting element into position back of the formed bale, means for holding the arm against movement relative to the twisting element while being so positioned, means for releasing the arm, and coöperating means upon the arm and twisting element for rotating said element while located within the forked portion.

11. The combination with compressing mechanism, of a needle having a forked portion for engaging that portion of a tie at one side of the bale being formed, a second needle, a revoluble twisting element carried thereby and normally engaging that portion of the tie at the other side of the bale being formed, an arm normally coupled to the last named needle, means for actuating said arm and the first named needle for positioning the twisting element within the forked portion, means for automatically uncoupling the arm from its needle when the twisting element is positioned within the forked portion and coöperating means upon the twisting element and the arm for rotating said element while seated in the forked portion and during the continuous movement of the arm in one direction.

12. The combination with compressing means, of a needle for engaging a tie at one side of a bale being formed, a second needle, a twisting element carried thereby for engaging a tie at the other side of the bale being formed, an arm coupled to the last named needle, means for actuating said arm and the first named needle to shift opposed portions of the tie into position back of the formed bale and to bring the twisting element into engagement with that portion of the tie engaged by the first named needle, means for uncoupling the arm from its needle during such movement of the arm and needles, and coöperating means upon the arm and twisting element for actuating said element during the completion of the movement of the arm in one direction.

13. The combination with compressing mechanism, of means for engaging a tie at one side of a bale being formed and pressing it into position back of said bale, an arm, means for actuating the arm in one direction, a needle coupled to the arm, a twisting element carried by the needle for engaging a tie and pressing it back of the formed bale, said twisting element being adapted to engage the opposed inwardly pressed portion of the tie during the first portion of the movement of the arm, means for automatically disconnecting the needle from the arm when the twisting element is brought into engagement with both portions of the tie, and coöperating means upon the arm and the twisting element for rotating said element during the continuous movement of the arm while uncoupled from the needle.

14. The combination with compressing mechanism, of an arm movable across the back of the formed bale, a needle, means for coupling the needle to said arm, a revoluble twisting gear carried by the needle, means for automatically uncoupling the arm from the needle upon the completion of a portion of the movement of the arm in one direction, and means upon the arm and engaging the gear for rotating said gear during the completion of said movement of the arm.

15. The combination with compressing mechanism, of an arm movable across the back of the formed bale, a needle, means for coupling the needle to said arm, a revoluble twisting gear carried by the needle, means for automatically uncoupling the arm from the needle upon the completion of a portion of the movement of the arm in one direction, means upon the arm and engaging the gear for rotating said gear during the completion of said movement of the arm, a cutting element carried by the needle, and means upon the arm for actuating said element upon the completion of said movement of the arm.

16. The combination with compressing mechanism, of an arm movable across the back of the formed bale, a needle, means for coupling the needle to said arm, a revoluble twisting gear carried by the needle, means for automatically uncoupling the arm from the needle upon the completion of a portion of the movement of the arm in one direction, means upon the arm and engaging the gear for rotating said gear during the completion of said movement of the arm, a cutting element carried by the needle, means upon the arm for actuating said element upon the completion of said movement of the arm, means for automatically returning the arm upon the completion of such movement, and means carried by the arm for setting the cutting element and for moving the needle with the arm back to its initial position.

17. The combination with compressing mechanism, of oppositely disposed structures mounted for swinging movement about a common axis, opposed needles carried by the respective structures, a plate pivotally connected to one of said structures and having an angular slot therein, a guide pin extending into the slot, and a link connection between the plate and the other structure, said plate and link connection constituting means for transmitting motion from one structure to the other.

18. The combination with a press box, a follower, and a shaft for actuating the follower, of tie twisting means movable back of the bale being formed, yielding means for holding said twisting means normally inactive, a normally stationary revoluble element, a pitman connection between said element and the twisting means, a clutch element revoluble with the shaft, means for holding said element normally inactive, and means operated by a bale being formed, for releasing said element to couple the normally stationary element to the shaft.

19. The combination with a follower and a shaft for actuating the same, of a normally stationary element, a drive connection between said element and twisting mechanism, a clutch member revoluble with the shaft, means for holding said member inactive during the rotation of the shaft, means operated by a bale being formed for releasing said holding means to couple the clutch member to the normally stationary element, and means adapted to be engaged by said clutch member for uncoupling the normally stationary element from the shaft and for resetting the holding means.

20. The combination with compressing mechanism including a slotted follower and mechanism for actuating the follower, said mechanism including a shaft, of twisting means, a normally stationary element, a drive connection between said element and the twisting means for directing said twisting means into the slot in the follower, yielding means for automatically withdrawing the twisting means from the follower, a clutch member revoluble with the shaft, means for holding said member normally inactive, means adapted to be operated by a bale being formed, for releasing said holding means upon the completion of a bale to couple said normally stationary element to the shaft, and means coöperating with said clutch member for releasing the normally stationary element from the shaft and for resetting the holding means.

21. The combination with compressing mechanism including a shaft and a follower actuated thereby, of twisting mechanism, yielding means for holding said mechanism normally inactive, a normally stationary element, clutch means for coupling said element to the shaft, means for holding the clutch means normally inactive, said means including a notched disk, revoluble bale actuated means yieldingly connected to the disk for rotating said disk to release the holding means, and means coöperating with the clutch member for disengaging said clutch member from the normally stationary element and for withdrawing the holding means from engagement with the notch in the disk.

In testimony that I claim the foregoing as my own, I have hereto affixed my signature in the presence of two witnesses.

ELMER CURNUTT.

Witnesses:
CHAS. D. HUNT,
W. W. GOWDY.